US008246877B2

(12) United States Patent
Järvinen

(10) Patent No.: US 8,246,877 B2
(45) Date of Patent: Aug. 21, 2012

(54) METHOD, APPARATUS AND A FORMING PART FOR CASTING A CONCRETE PRODUCT BY SLIPFORM CASTING

(75) Inventor: Lassi Järvinen, Valkeakoski (FI)

(73) Assignee: Elematic Oy AB, Toijala (FI)

( * ) Notice: Subject to any disclaimer, the term of this patent is extended or adjusted under 35 U.S.C. 154(b) by 34 days.

(21) Appl. No.: 11/794,678

(22) PCT Filed: Jan. 3, 2006

(86) PCT No.: PCT/FI2006/050004
§ 371 (c)(1), (2), (4) Date: Jul. 3, 2007

(87) PCT Pub. No.: WO2006/072664
PCT Pub. Date: Jul. 13, 2006

(65) Prior Publication Data

US 2008/0111279 A1 May 15, 2008

(30) Foreign Application Priority Data

Jan. 7, 2005 (FI) ..................................... 20050015

(51) Int. Cl.
*D01D 5/24* (2006.01)
*B28B 3/00* (2006.01)
*A01J 21/00* (2006.01)
*B28B 7/30* (2006.01)

(52) U.S. Cl. ........... 264/209.1; 264/33; 264/34; 264/69; 264/70; 264/71; 264/209.2; 264/299; 264/313; 264/319; 264/328.1; 264/328.2; 264/333; 425/63; 425/64; 425/380; 425/426; 425/456; 425/468; 249/178; 249/180; 249/181; 249/182; 249/185

(58) Field of Classification Search .................. 264/294, 264/296, 299, 319, 333, 33, 34, 69, 70, 71, 264/209.1, 209.2, 313, 328.1, 328.2; 425/63, 425/64, 380, 426, 456, 468; 249/178, 180, 249/181, 182, 185
See application file for complete search history.

(56) References Cited

U.S. PATENT DOCUMENTS 5,618,476 A * 4/1997 Mogel .......................... 264/40.1
2003/0227102 A1 * 12/2003 Sahala et al. .................... 264/86

(Continued)

FOREIGN PATENT DOCUMENTS

DE 24354 10/1883

(Continued)

OTHER PUBLICATIONS

Translation of DE 2453706 A1.*

(Continued)

*Primary Examiner* — Christina Johnson
*Assistant Examiner* — Atul P Khare
(74) *Attorney, Agent, or Firm* — Buchanan Ingersoll & Rooney PC

(57) ABSTRACT

Method and apparatus for casting a concrete product with a substantially horizontal slipform casting process, wherein the concrete mix is fed at least in one step through a limited cross-section moving progressively along with the cast, whereby the height of the product forming part (1) is changed during the cast. The invention also comprises a product forming part (1) having an adjustable height.

8 Claims, 3 Drawing Sheets

U.S. PATENT DOCUMENTS

2005/0084555 A1* 4/2005 Jarvinen et al. ................. 425/64

FOREIGN PATENT DOCUMENTS

| | | | | |
|---|---|---|---|---|
| DE | 2453706 | A1 | * | 5/1976 |
| EP | 0 125 084 | A2 | | 11/1984 |
| EP | 0 677 362 | A1 | | 10/1995 |
| EP | 677362 | A1 | * | 10/1995 |
| EP | 1 525 968 | A2 | | 4/2005 |
| FI | 102253 | B | | 3/1997 |
| NL | 7513155 | | | 5/1976 |
| WO | WO 97/07949 | | | 3/1997 |
| WO | WO 9707949 | A1 | * | 3/1997 |
| WO | WO 2004101241 | A1 | * | 11/2004 |

OTHER PUBLICATIONS

Supplementary European Search Report for EP 06700067 dated Mar. 18, 2009.

Summons to Oral Proceedings dated Oct. 15, 2010 issued by the European Patent Office for European Patent Application No. 06 700 067.9 (*in the English language*).

* cited by examiner

METHOD, APPARATUS AND A FORMING PART FOR CASTING A CONCRETE PRODUCT BY SLIPFORM CASTING

BACKGROUND

1. Field

Disclosed herein are slipform cast concrete products and to slipform casting apparatus used in casting, as well as parts for forming the products to be cast. More precisely, disclosed herein are methods for adjusting and changing the product height of a product to be slipform cast.

2. Description of Related Art

There are many different slipform casting methods and devices known in the art. The most essential slipform casting solutions in use nowadays are generally based on extruder or slipformer methods. In the solutions based on the extruder technique, the concrete mix is fed from the concrete tank to feed screws that extrude the concrete to the mold defined by the casting bed and the side and upper plates. When casting hollow-core slabs, the feed screws are followed by hollow-core forming mandrels forming the hollow-cores to the concrete product to be cast. The compacting of the concrete product to be cast is effected by the vibrating and/or leveling motion of the side and upper plates and the forming of the hollow-core is secured by the compacting motion of the hollow-core mandrel. The casting machine moves along the casting bed driven by the reacting force, supported by the wheels of the machine. The finished cast product remains on the casting bed.

In the solutions based on the slipformer-technique, the concrete mix is fed by proceeding to cast first to the lower part of the mold defined by the side plates moving along with the casting machine and the casting bed. This first feed of the concrete is followed by vibrating shoes and forming mandrels that, by vibrating the concrete mix, compact the cast concrete mix and make the final form of the lower part of the product. During a second feed, concrete mix is fed onto the end parts of the hollow-core forming mandrels for casting the upper part of the product to be cast, said concrete mix to be compacted with a vibrating pate located on top of the rear end. The finished product remains on the casting bed.

The slipform casting is usually used for casting of longitudinal products, which then are sawn to form products having a suitable length after hardening of the concrete.

A problem with the slipform casting devices known in the art is, however, that when the thickness of the product to be cast changes, the casting machine must be lifted away from the casting bed for changing the tools for forming the product and the tools for compacting. This is time consuming and expensive due to the production downtimes caused by the changes.

Another alternative has been to provide a specific casting machine for each product type to be cast, whereby the change of the product to be cast can be performed quickly simply by changing the casting machine on the casting bed. This alternative, however, requires a lot of capital investments in equipment, especially, because the product range of the products to be cast is typically large.

SUMMARY

By means of the embodiment disclosed herein, it is possible to overcome the afore-mentioned drawbacks of the technique of prior art. In the solution described herein, the height of the compacting plate and the forming part can be adjusted, whereby the height of the product to be cast can be easily adjusted, enabling the production of products having different heights with one and the same slipform casting machine. In addition, with the solution described herein, the height of the product to be cast can be changed during the cast. In this way, for example, the lower portions of product required by, e.g. a bathroom, can be cast directly to the products to be manufactured.

In this connection the forming part of the product refers to a part or a surface defining the cross-section of the concrete product to be cast. The term “compacting plate” in this connection refers to the surface defining the upper surface of the product, said surface compacting the upper surface of the product by a troweling and/or vibrating compacting motion.

More precisely, in an embodiment disclosed herein is provided a method for casting a concrete product with a substantially horizontal slipform casting process, whereby the concrete mix is fed at least in one step through a limited cross-section moving progressively along with the cast, wherein the distance between the upper surface (2) and the lower surface (3) of the hollow-core forming part (1) is changed during the cast.

BRIEF DESCRIPTION OF DRAWINGS

The method and apparatus described herein will be exemplified in more detail in the following with reference to the enclosed drawings, wherein.

DETAILED DESCRIPTION OF SPECIFIC EMBODIMENTS

Figure 1B:
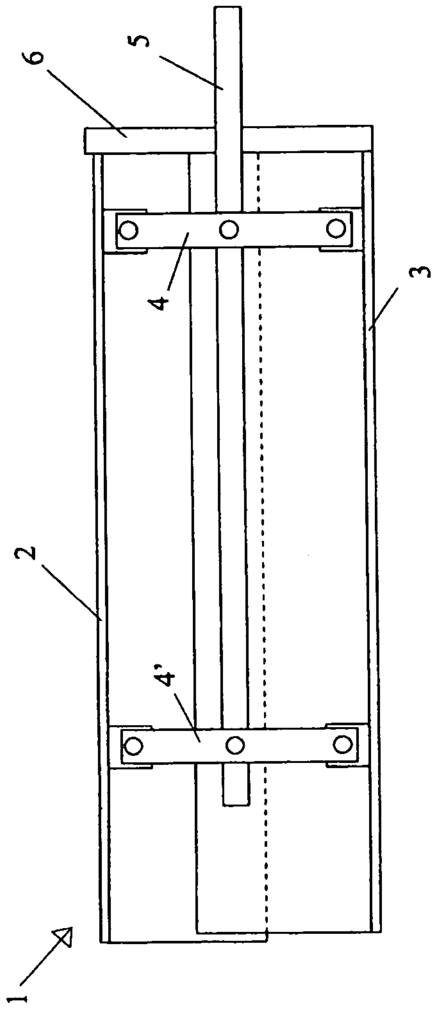
FIG. 1B is a schematic diagram that shows a cross-sectional side view of one product forming part in accordance with the embodiment shown in FIG. 1A, in its upper position.
Figure 1A:
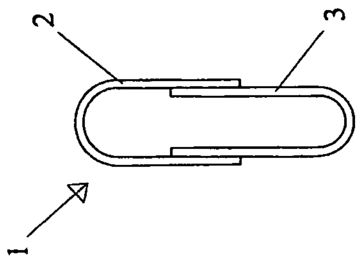
FIG. 1A is a schematic diagram that shows the location of the surface parts of one product forming part in accordance with an embodiment described herein, in its upper position, as an end view.

FIGS. 1A and 1B show the construction of one product forming part in accordance with an embodiment described herein the forming part being in its upper position. As it can be seen in FIG. 1A, the outer surface of the product forming part 1 is formed of an upper part 2 and a lower part 3, having substantially a U-formed profile and said upper part and lower part setting partly within each other. FIG. 1B illustrates the internal construction of the product forming part, whereby the upper part 2 and the lower part 3 are connected with each other with a tie bar 4 and 4'. The tie bars 4, 4' are attached turnably to the upper part and lower part of the core tube. The tie bars 4, 4' are connected with each other by means of an operating rod 5 extending outside the front edge of the product forming part 1. In the front edge of the product forming part there is a front plate 6, attached to the lower part 3. The front plate 6 prevents the concrete from entering into the product forming part during the cast.

Figure 2B:
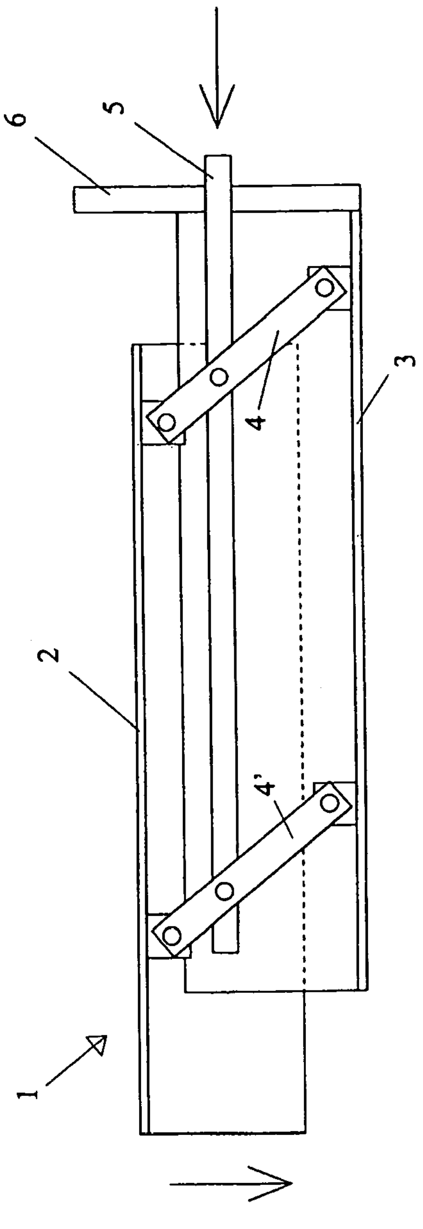
FIG. 2B is a schematic diagram that shows a cross-sectional side view of a product forming part in accordance with the embodiment shown in FIG. 2A in its lower position.
Figure 2A:
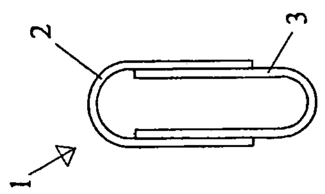
FIG. 2A is a schematic diagram that shows the location of the surface parts of one product forming part in accordance with an embodiment described herein, in its lower portion, as an end view.

FIGS. 2A and 2B illustrate the product forming part according to FIGS. 1A and 1B in its lower position. The product forming part 1 is moved to its lower position by pushing the operating rod 5 towards the product forming part, whereby the operating rod 5 moves inside the product forming part making the tie bars 4, 4' to turn into the position shown in FIG. 2B, The motion of the tie bars 4, 4' makes the upper part 2 of the product forming part to loosen from the front plate 6 as well as the motion of the upper part backwards and downwards. Correspondingly, by moving the operating rod 5 away from the product forming part, the height of the forming part can be increased.

In this way the height of the product forming part 1 can be changed between the upper position shown in FIGS. 1A and 1B and the lower position shown in FIGS. 2A and 2B. Only two positions of the product forming parts have been illustrated in said Figures, but is should be appreciated, that the core tube can be adjusted to any height between the extreme positions.

A solution of the mechanical adjustment of the height of the product forming part is shown in FIGS. 1A, 1B, 2A and 2B. The adjustment of the height of the product forming part in accordance with the invention this embodiment, however, can be provided by means of a hydraulic and/or pneumatic height adjusting device, preferably located inside the product forming part.

Figure 3:
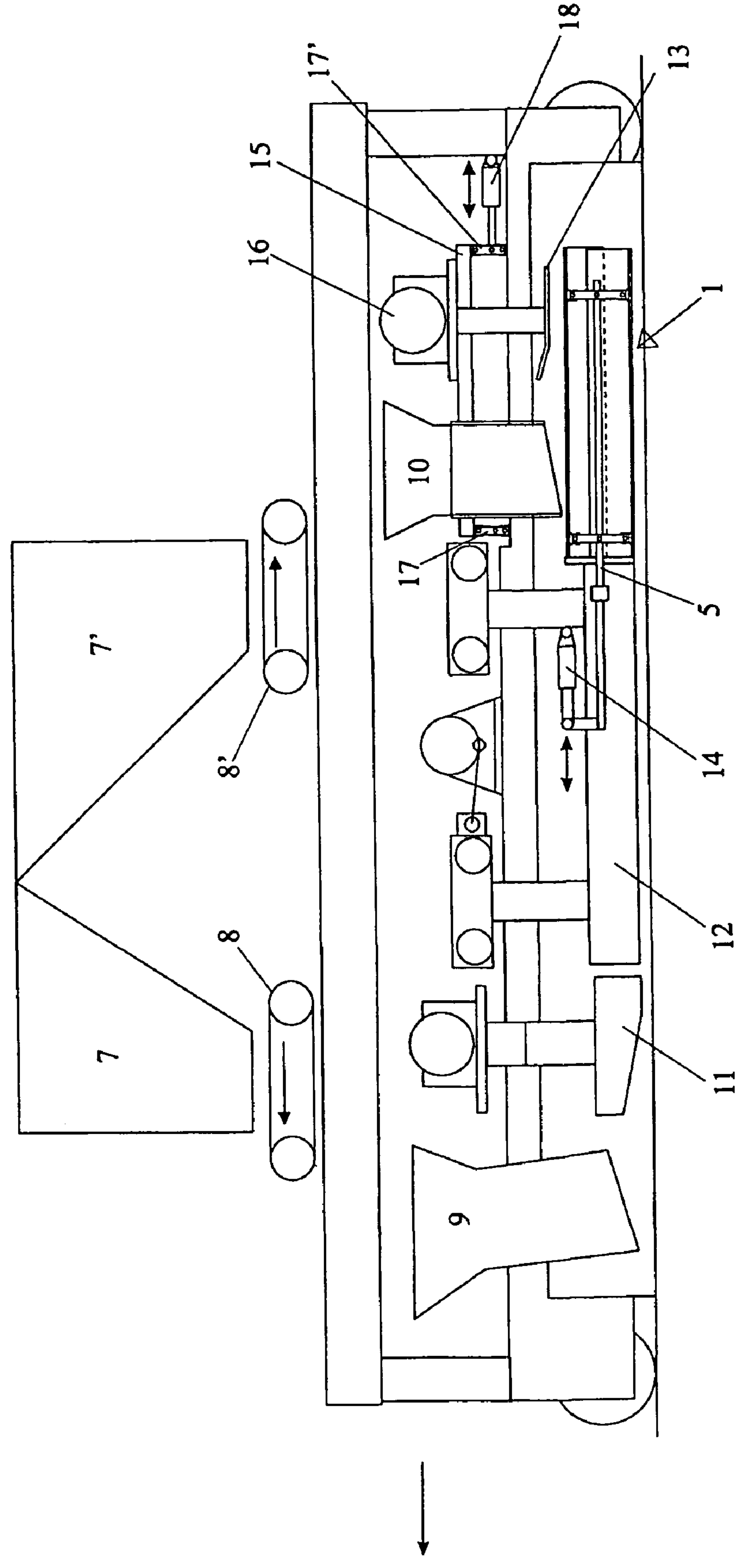
FIG. 3 is a schematic diagram that shows a cross-sectional side view of one slipform casting machine in accordance with an embodiment described herein, the product forming part being in its upper position.

FIG. 3 shows a slipformer-type casting machine equipped with a product forming part 1 in accordance with this embodiment. In the example of the figure, the product forming part is in its upper position. When using a casting machine of this kind of a slipformer-type, the concrete mix is fed from the feeding tank 7, 7' via conveyors 8, 8' to the foremost feed hopper 9 and to the rearmost feed hopper 10. Through the foremost feed hopper the concrete mix is guided to the lower part of the casting mold defined by the side plates proceeding along with the casting machine and the casting bed. A vibrating shoe 11 and a forming tube 12 provide the form of the lower part of the product in the concrete. The forming tube 12 is followed by the product forming part 1, onto which the concrete mix for forming the upper part of the concrete product is fed from the rearmost feed hopper 10. The feed hopper 10 is followed by the compacting plate 13 defining the upper surface of the cast mold, said compacting plate 13 being located on top of the end portion of the product forming part 1, and compacting the concrete, as well as defining the position of the upper surface of the concrete product to be cast. When the slipform casting machine proceeds, the finished product remains on the casting bed.

For adjusting the height of the product forming part 1, the slipform casting machine is equipped with a hydraulic cylinder 14 for moving the operating rod 5 of the product forming part in the direction shown by the arrow beside the hydraulic cylinder 14, thus changing the height of the product forming part. For casting the lowered portion to the product to be cast, the slipform casting machine is equipped with a movable stand 15 having a feeding hopper 10 attached thereto on top of the product forming part 1 for feeding the concrete mix, as well as a compacting plate 13 and a vibrator 16 vibrating the same. The stand 15 is attached to the slipform casting machine by means of tie bars 17, 17'. The stand is movable with a hydraulic cylinder 18 in the direction shown by the arrow.

Figure 4:
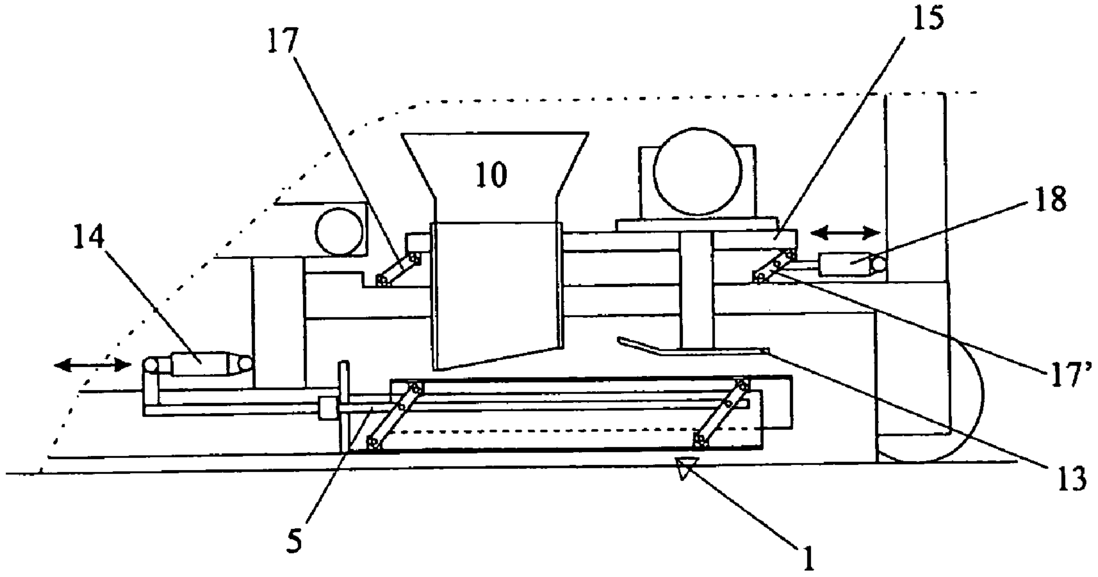
FIG. 4 is a schematic diagram that shows a partial cross-sectional view of the rear part of the slipform casting machine of FIG. 3, at the region of the product forming part, the forming part being in its lower position.

When the casting machine proceeds to the lowered portion to be cast, the height of the product forming part 1 as well as the position of the stand 15 is changed to one shown by the partial cross-section of FIG. 4. Thus, the hydraulic cylinder 14 has moved the operating rod 5 of the product forming part towards the product forming part, whereby the upper part of the product forming part 1 has moved backwards and lowered to the desired height. At the same time, the hydraulic cylinder 18 has drawn the stand 15 towards itself, whereby the tie bars 17, 17' have turned backwards to the position shown in the Figure, and the stand 15 has moved backwards and downwards to the desired height. Thereby the positions of the feed hopper 10 and the compacting plate 13 have changed corresponding to the height required by the cast of the lowered portion. In this way, the uniform thickness of the wall of the upper part of the concrete product can be secured throughout the product.

The invention is not limited to the use of a hydraulic cylinder for adjusting the height of the product forming part and the compacting plate, but also other suitable devices, like for example pneumatic devices can be used. The adjustment of the height of the product forming part and the compacting plate can also be implemented manually, if necessary.

Figure 5:
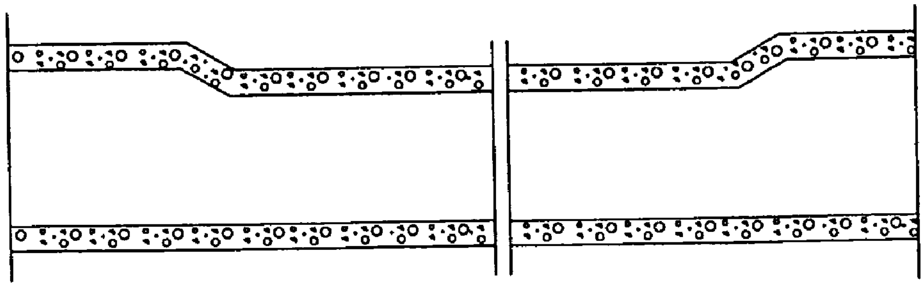
FIG. 5 is a schematic diagram that shows an example of a product cast by means of a casting apparatus in accordance with an embodiment described herein, as a cross-sectional view at the hollow-core.

FIG. 5 shows an example of a hollow-core product with a lowered portion, made by a slipform casting apparatus in accordance with an embodiment described herein. The cross-sectional view shows that at the lowered portion, the thickness of the upper wall of the product substantially corresponds to the wall thickness of a product with normal height. Further, the lower portion can be easily cast to a desired place with a desired length.

The solution in accordance with the embodiments described herein is not limited only to casting of lowered portions to a product to be cast. The solution also enables using of one and the same casting machine for casting products having different heights. In addition, with the solution in accordance with the embodiments described herein, also the thickness of the upper surface of the product to be cast can be easily changed.

Further, the product forming part in accordance with the embodiments described herein is not limited to the slipformer-type machine as shown in the example, but it can also be used in other types of slipform casting machines with small structural alterations.

Advantageously, the forming part of the product to be cast according to the embodiments described herein is the forming part for forming the hollow core to the product to be cast.

The present invention having been described with reference to certain specific embodiments thereof, it will be understood that these specific embodiments are not intended to limit the scope of the appended claims.

The invention claimed is:

1. A method for casting a concrete product with a substantially horizontal slipform casting process, the method comprising:

feeding a concrete mix in one or more steps to a slipform casting apparatus comprising:

a cast mold comprising side plates, a casting bed, and an adjustable compacting plate disposed above the casting bed; and a single hollow-core forming part having an upper surface and a lower surface defining a limited cross-section disposed within the cast mold above the casting bed and below the adjustable compacting plate, wherein the hollow-core forming part moves progressively along with the slipform casting apparatus and away from the cast concrete mix, and changing a distance between the upper surface of the hollow-core forming part and the lower surface of the hollow-core forming part during the slipform casting process, wherein changing the distance between the upper surface and the lower surface of the hollow-core forming part comprises turning tie rods, each having one end attached to the upper surface and another end attached to the lower surface of the hollow-core forming part, and wherein the concrete mix is fed around all sides of the hollow-core forming part so that the resulting concrete product has a hollow profile varying in cross-section along the length thereof.

2. The method in accordance with claim 1, wherein turning the tie rods comprises moving an operating rod attached to each of the tie rods.

3. A method in accordance with claim 1, further comprising changing a position of the adjustable compacting plate during the slipform casting process of the concrete mix.

4. A method in accordance with claim 3, wherein changing the position of the compacting plate and changing the distance between the upper surface and lower surface of the hollow-core forming part occur simultaneously.

5. The method in accordance with claim 3, wherein changing the position of the compacting plate comprises changing the height of the compacting plate with respect to the casting bed.

6. The method in accordance with claim 3, wherein the slipform casting apparatus further comprises a feed hopper disposed above the hollow-core forming part, the method further comprising changing the position of the feed hopper relative to the casting bed during casting of the concrete mix.

7. The method in accordance with claim 6, wherein changing the position of the feed hopper comprises changing the height of the feed hopper with respect to the casting bed.

8. The method in accordance with claim 7, wherein the feed hopper and the hollow-core forming part are connected such that changing the height of the feed hopper and changing the distance between the upper surface of the hollow-core forming part and the lower surface of the hollow-core forming part occurs simultaneously.

* * * * *